United States Patent
Brokaw et al.

(10) Patent No.: US 7,098,633 B1
(45) Date of Patent: Aug. 29, 2006

(54) BOOST CONVERTER WITH SERIES SWITCH

(75) Inventors: A. Paul Brokaw, Tucson, AZ (US); Jeffrey G. Barrow, Tucson, AZ (US); Marc J. Kobayashi, Oro Valley, AZ (US); Christian S. Birk, Tucson, AZ (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/182,366

(22) Filed: Jul. 15, 2005

(51) Int. Cl.
*G05F 3/16* (2006.01)

(52) U.S. Cl. ............... 323/222; 323/224; 323/266

(58) Field of Classification Search ......... 323/222, 323/224, 266
See application file for complete search history.

(56) References Cited

U.S. PATENT DOCUMENTS

| | | | | |
|---|---|---|---|---|
| 5,216,351 A | * | 6/1993 | Shimoda | ............... 323/224 |
| 5,592,072 A | * | 1/1997 | Brown | ............... 323/268 |
| 6,850,044 B1 | * | 2/2005 | Hansen et al. | ............... 323/266 |
| 6,862,201 B1 | * | 3/2005 | Hodge, Jr. | ............... 363/89 |

* cited by examiner

*Primary Examiner*—Shawn Riley
(74) *Attorney, Agent, or Firm*—Koppel, Patrick & Heybl

(57) ABSTRACT

A switching voltage converter, suitably a boost converter, employs an n-type transistor, preferably an NMOS FET, as a series switch, with its drain coupled to the cathode of the converter's diode and its source coupled to the converter's output node. A charge pump driven by the converter's switching voltage provides a voltage $V_{on}$ at the NMOS FET's gate input sufficient to turn the FET on. A series switch controller is arranged to, in response to a control signal, hold the NMOS FET off such that the converter's output voltage $V_{out}$ is approximately zero regardless of the status of input voltage $V_{in}$, or allow the NMOS device to be turned on by $V_{on}$.

25 Claims, 4 Drawing Sheets

BOOST CONVERTER WITH SERIES SWITCH

BACKGROUND OF THE INVENTION

1. Field of the Invention

This invention relates to the field of switching voltage converters, and particularly to boost converters which employ a switch in series with the boost converter output.

2. Description of the Related Art

Switching voltage converters are well-known and widely-used to provide regulated output voltages. Such converters can be configured in a number of different ways; one configuration is known as a "boost" converter, which can provide an output voltage that is greater than the input voltage supplied to the converter.

A basic boost converter is shown in FIG. 1a. An inductor L1 is connected between the input voltage $V_{in}$ and a switching node 10, and a switch—here implemented with a field-effect transistor (FET) MN1—is connected between switching node 10 and a circuit common point 12. A diode D1 is connected in series between node 10 and the converter's output at node 18. MN1 is part of a switching circuit 14 which includes a controller 16 that cycles MN1 so as to periodically connect L1 across input voltage $V_{in}$. When MN1 is turned on, the voltage at switching node 10 ($V_{sw}$) goes low and the current in L1 ramps up in proportion to the voltage across it and inversely to its inductance. When MN1 is turned off, $V_{sw}$ goes high until D1 conducts, a point when the voltage across the inductor is reversed and the current in L1 ramps down. When $V_{sw}$ is sufficiently positive, current is conducted via D1 to a load capacitor C1 at the converter's output node 18 to produce the converter's output voltage $V_{out}$. A feedback circuit 22 provides a signal which varies with the voltage at node 18 to controller 16, which adjusts the duty ratio of MN1 so as to regulate the voltage at node 18. C1 is made large enough to average the current pulses from L1 through D1 and keep the load ripple voltage below some desired minimum.

A common problem in the application of this type of boost converter is that, although the switching of MN1 can be stopped by a control signal (not shown), $V_{out}$ will not go to zero if $V_{in}$ is present. Instead, the path from $V_{in}$ through L1 and D1 to output node 18 will keep $V_{out}$ from falling much below $V_{in}$. In some applications, such as powering the control electronics for an LCD display, this feedthrough is undesirable. In these cases, $V_{out}$ should remain substantially zero when $V_{in}$ is initially applied, until other electronics also powered from $V_{in}$ can be activated.

FIG. 1b illustrates a known solution to this problem. A series switch, typically a PMOS FET MP1, is connected between node 18 and a node 20. Node 18 is now an intermediate node, and node 20 becomes the converter's output node at which output voltage $V_{out}$ is provided. A second load capacitor C2 would typically be connected between node 20 and circuit common. MP1 is controlled with a switch control circuit 24; when switch control circuit 24 holds MP1's gate voltage close to its source voltage, the switch will be off, and output voltage $V_{out}$ can remain substantially zero, even though C1 may be charged to $V_{in}$. After $V_{in}$ is applied and other circuits powered by $V_{in}$ have reached some desired operating condition, switch control circuit 24 can drive the gate of MP1 low, turning it on and connecting the voltage on C4 to output node 20. This makes $V_{out}$ approximately equal to either $V_{in}$ by way of L1 and D1 if switching has not been initiated, or to the boosted voltage present on C4 by virtue of having started the boost converter switching.

This solution has a drawback, however. The voltage on C1 is regulated by the feedback loop connected to node 18. This works well when node 18 is the converter's output node, but when the series switch is added, some regulation is lost due to MP1's series resistance. Therefore, in order to maintain good load regulation, a device which may be unacceptably large is needed for MP1 to minimize this resistance.

SUMMARY OF THE INVENTION

A switching voltage converter is presented which overcomes the problem noted above, by enabling the use of an NMOS FET as the series switch.

The present converter, typically a boost converter, includes an input node for receiving an input voltage $V_{in}$ and an output node at which the converter provides an output voltage $V_{out}$. A switching circuit includes an inductor coupled between $V_{in}$ and a switching node, and a switch connected to control the voltage applied across the inductor. A diode is connected between the switching node and an intermediate node to which a load capacitor is connected. The switching circuit is arranged to cycle the switch and thereby produce a switching voltage $V_{sw}$ at the switching node; the switching can be controlled so as to regulate the voltage at the intermediate node.

An n-type transistor, preferably an NMOS FET, is employed as a series switch, with its drain coupled to the intermediate node and its source coupled to the output node. A charge pump is driven by the switching voltage $V_{sw}$ to provide a voltage $V_{on}$ at the NMOS FET's gate input sufficient to turn the FET on. A series switch controller is arranged to, in response to a control signal, hold the NMOS FET off such that output voltage $V_{out}$ is approximately zero regardless of the status of input voltage $V_{in}$, or allow the NMOS device to be turned on by $V_{on}$.

NMOS FETs have a lower channel resistance than a comparably sized and driven PMOS device. Thus, by implementing the series switch with an NMOS FET a lower resistance and/or smaller die size can be achieved.

Further features and advantages of the invention will be apparent to those skilled in the art from the following detailed description, taken together with the accompanying drawings.

DETAILED DESCRIPTION OF THE INVENTION

The present invention may be useful with various switching voltage converter configurations, but is particularly advantageous when employed with a boost converter due to the inherent input voltage feedthrough problem described above. For simplicity, a boost converter application is used to illustrate the present invention, though the series switch arrangement described herein could be used with other converter types. It should also be noted that, though the exemplary embodiments herein are described and shown implemented with FETs, bipolar transistors could also be used.

Figure 1A:
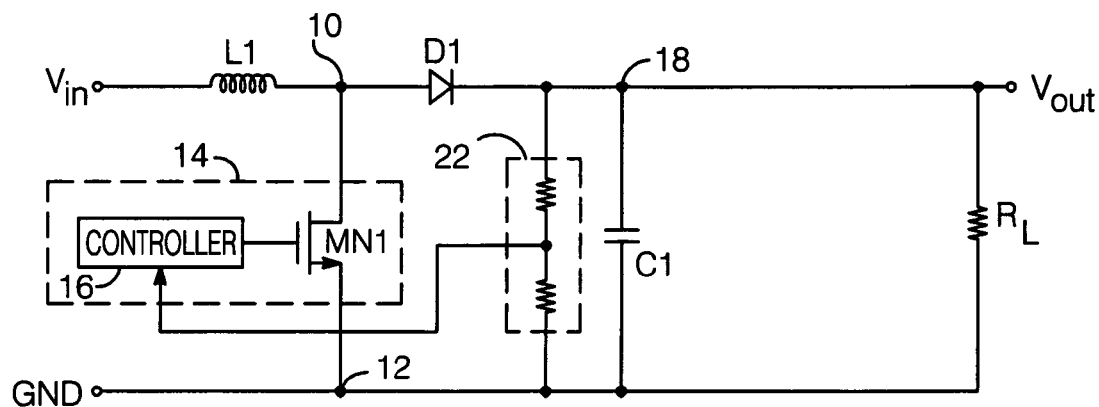
FIG. 1a is a schematic diagram of a known boost converter.
Figure 1B:
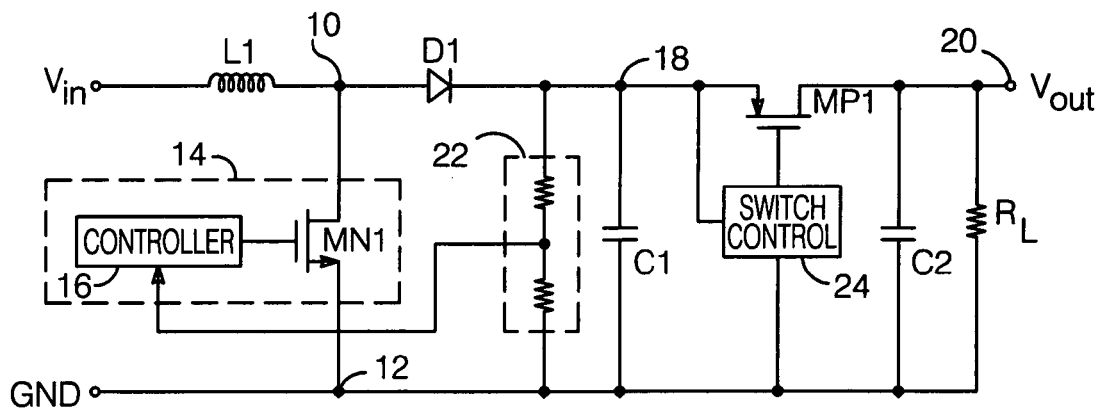
FIG. 1b is a schematic diagram of a known boost converter with series switch.
Figure 2:
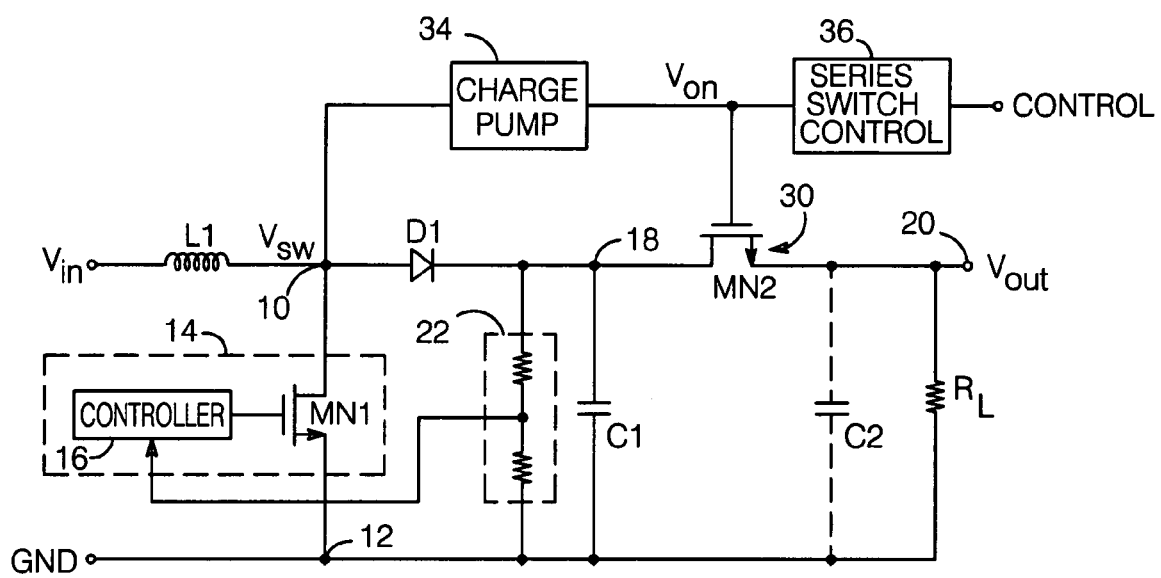
FIG. 2 is a block/schematic diagram of a boost converter with series switch per the present invention.

A boost converter with series switch per the present invention is shown in FIG. 2. As described above, an input voltage $V_{in}$ is connected to one terminal of inductor L1, the other terminal of which is connected to switching node 10. A switch—here implemented with a field-effect transistor (FET) MN1, though other types of switching devices could also be used—is connected between switching node 10 and a circuit common point 12; common point 12 is typically ground, but could also be a non-zero potential. MN1 is part of a switching circuit 14 which includes a controller 16 that cycles MN1 so as to periodically connect L1 across input voltage $V_{in}$. Diode D1 is connected between switching node 10 and an intermediate node 18, and load capacitor C1 is connected between node 18 and common point 12. As noted above, when MN1 is turned on, $V_{sw}$ goes low and the current in L1 ramps up, and when MN1 is turned off, $V_{sw}$ goes high until D1 conducts, a point when the voltage across the inductor is reversed and the current in L1 ramps down. Feedback circuit 22 provides a signal which varies with the voltage at intermediate node 18 to controller 16, which adjusts the duty ratio of MN1 so as to regulate the voltage at node 18.

The present converter includes a switch 30 connected in series between intermediate node 18 and the converter's output node 20 at which output voltage $V_{out}$ is provided. Switch 30 is implemented with an n-type transistor: either an NMOS FET (MN2, as shown) or an NPN bipolar transistor. The transistor's drain (collector) is connected to intermediate node 18, and its source (emitter) is connected to output node 20. An NMOS FET has a lower channel resistance than a comparably sized and driven PMOS device as might have been used in prior art designs. Thus, by implementing series switch 30 with an NMOS FET as described herein, a lower resistance and/or smaller die size can be achieved.

However, a complication of using an NMOS switch is that, to turn the switch on, its gate must be driven more positive than its source. Since $V_{out}$ is to be driven as close as is practical to the voltage on C1, this means that the gate of MN2 needs to be driven more positive than any other voltage available from the boost converter. This is accomplished with the use of a charge pump 34, which is driven by the switching voltage $V_{sw}$ that appears at node 10 when MN1 is cycled. Charge pump 34 can develop a voltage approaching twice $V_{out}$ to drive MN2; this voltage ($V_{on}$) is applied to the gate of MN2.

The present converter also includes a series switch control circuit 36, which pulls the gate of MN2 low or releases the gate in response to a control signal (CONTROL). When it is desired that $V_{out}$ be zero, control circuit 36 holds the gate of MN2 low such that MN2 is turned off. When $V_{out}$ is to come up, control circuit 36 releases MN2's gate. When the boost converter switching has been initiated and $V_{on}$ has increased such that MN2's gate is sufficiently positive with respect to its source, MN2 will be turned on and $V_{out}$ becomes approximately equal to the boosted voltage on C1. In this way, output voltage $V_{out}$ can be made to remain substantially zero when $V_{in}$ is applied, and then allowed to be brought up to the desired value at the appropriate time—such as after other electronics also powered from $V_{in}$ have been activated.

The converter preferably includes a capacitor C2 connected between output node 20 and circuit common point 12, to provide a capacitive source for fast load current spikes.

Figure 3A:
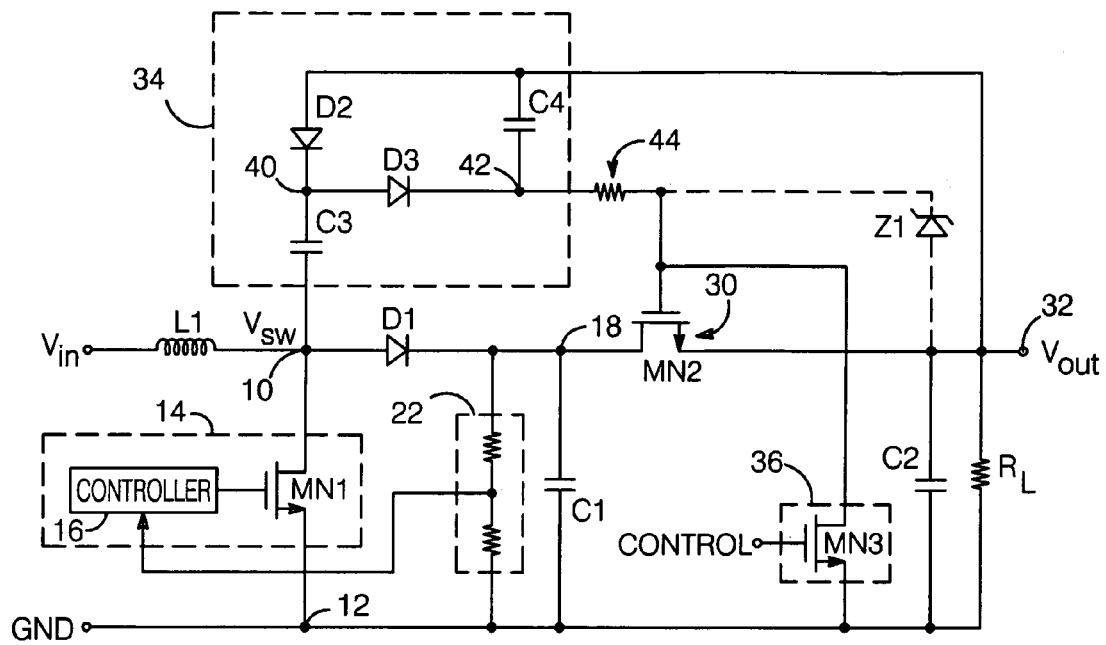
FIG. 3a is a schematic diagram of one possible implementation of a boost converter with series switch per the present invention.

A schematic diagram illustrating one possible implementation of charge pump 34 and series switch control circuit 36 is shown in FIG. 3a. Charge pump 34 comprises a capacitor C3 connected between switching node 10 and a node 40, a diode D2 connected between node 40 and output node 20, a capacitor C4 connected between output node 20 and a node 42, and a diode D3 connected between nodes 40 and 42. Node 42 is coupled to the gate of series switch transistor MN2 via a resistor 44. Series switch control circuit 36 is implemented with an NMOS FET MN3 connected between the gate of MN2 and circuit common point 12, and driven by CONTROL—which may be a ground-referenced signal.

When $V_{out}$ is to be zero, turning on MN3 with CONTROL connects the gate of MN2 to circuit common point 12, thereby turning it off (assuming that circuit common point 12 is less than or equal to $V_{out}$). If MN1 is held off by controller 16, MN3 will also discharge any voltage on C4 so that even if MN3 is subsequently turned off, MN2 will remain off. Moreover, the voltage at the node 40 end of C3 will be approximately zero, while the switching node end of C3 is charged to $V_{in}$.

If, in this condition, switching of MN1 is initiated, C3 will drive D2 with respect to $V_{out}$, and assuming C3 is small relative to C2 and/or $R_L$, C3 will be discharged to almost zero, having approximately zero volts at both ends. When MN1 is cycled off, L1 drives switching node 10 positive, and C3 will drive D3, forward biasing it and charging C4.

If C3 is large relative to C4, then the resulting voltage across C4 can be a large fraction of $V_{in}$—the approximate voltage across C3—and after only a few switching cycles, C4 can be charged to a voltage close to the peaks of $V_{sw}$. If MN3 is turned off, this voltage is applied to the gate of MN2 by way of resistor 44. Since the voltage across C4 may rise to a level approximately equal to the output boost voltage on C1, the addition of a breakdown diode Z1 may be advisable to limit the gate-source voltage applied to MN2.

If C3 is small relative to C4, the amount of charge deposited in C3 during each boost cycle will only make a small change in voltage across C4. As a result, the gate voltage of MN2 will rise slowly, allowing a gradual pickup of the output load on C1. This may be desirable to limit inrush current through L1 to the load as the boost converter is started.

Figure 3B:
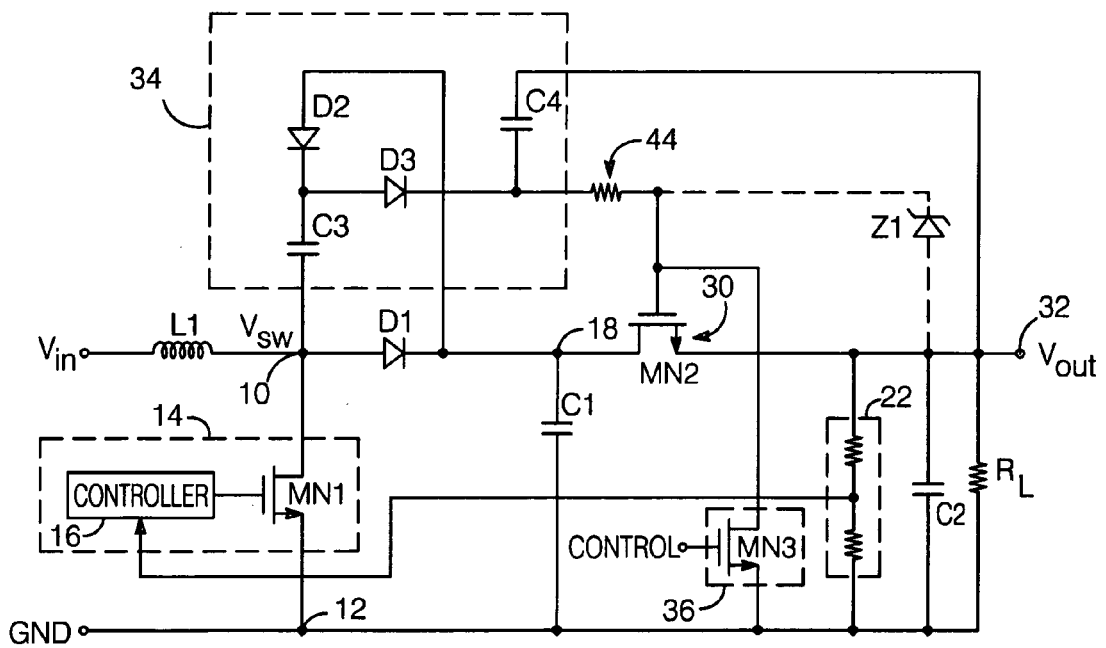
FIG. 3b is a schematic diagram of another possible implementation of a boost converter with series switch per the present invention.

A schematic diagram illustrating another possible implementation for the present switching converter is shown in FIG. 3b. This configuration provides an alternative connection for diode D2—its anode is connected to intermediate node 18 rather than to C4—which may be used to precharge C4. In this arrangement, there is a path from $V_{in}$ to resistor 44 by way of L1, D1, D2, and D3. If, after power is applied to $V_{in}$, MN3 is turned off, MN2 will be turned on by the voltage on C4. C4 will be bootstrapped by its connection to $V_{out}$, so that as $V_{out}$ rises D3 may become reverse-biased and MN2 can clamp $V_{out}$ to the voltage at the top of C1. C4 will be discharged through resistor 44, but only until it reaches the breakdown voltage of Z1 (if present), whereafter it will only slowly discharge due to leakage. This arrangement can be used to pre-bias $V_{out}$ to just below $V_{in}$ before starting the boost converter. Once the converter starts, charge pump 34 will operate to restore any charge lost to leakage.

FIG. 3b also shows an alternate connection for feedback circuit 22. This connection allows the converter to regulate the load voltage, rather than the intermediate voltage on C1. This connection is desirable to improve load regulation by reducing the closed loop output impedance of the circuit to the load. Note that, when the feedback circuit is configured as shown in FIG. 3b, MN3 must be switched off so that the load can be reflected back to C1 before the boost raises this intermediate voltage excessively, which could damage MN1 and MN2. In the case where $V_{out}$ is precharged by turning on MN2 before the boost converter, this should not be a problem, but using this feedback circuit connection in a circuit like that shown in FIG. 3a would require that MN3 be turned off before or within a few cycles of the time the converter is started.

Note that, for the charge pump of FIG. 3b, there is a DC path from $V_{in}$ to the gate of series switch MN2, via L1, D1, D2, D3 and resistor 44. When MN3 is on, MN2 is held off, but when MN3 is off, $V_{in}$ is conveyed to the gate of MN2 and will start to drive the load. In contrast, for the charge pump of FIG. 3a, there is no DC path from $V_{in}$ to MN2's gate. Thus, MN3 can be turned on to set an off state and then turned off, and MN2 will remain off until driven by the charge pump when the converter is started.

Figure 4A:
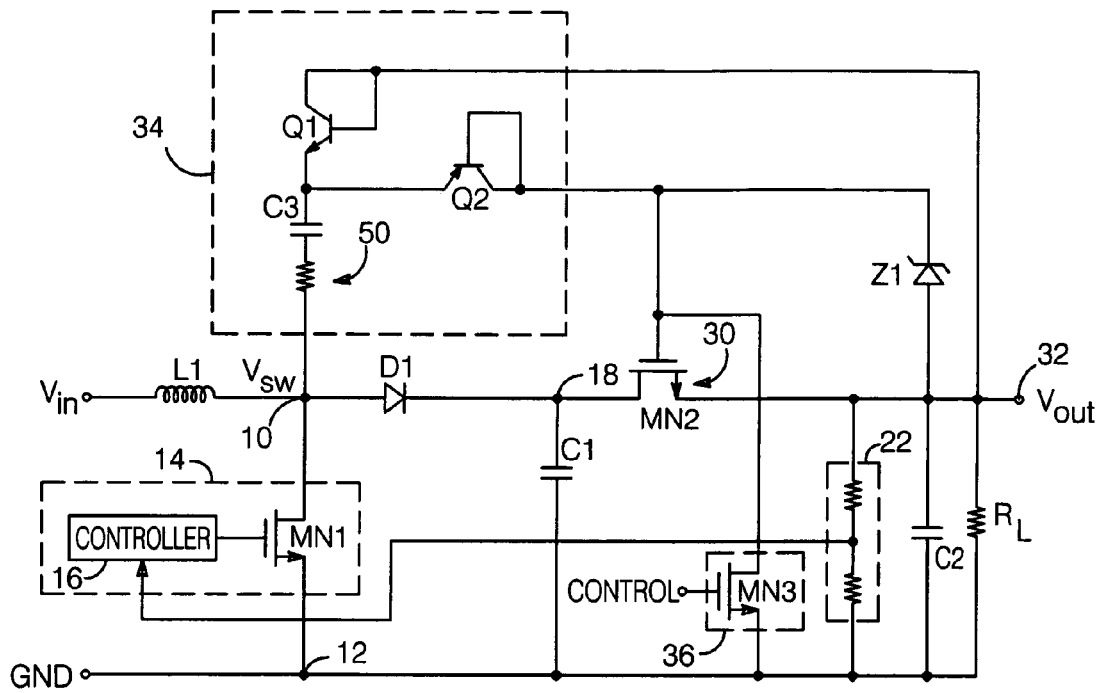
FIG. 4a is a schematic diagram of another possible implementation of a boost converter with series switch per the present invention.

With the exception of inductor L1, diode D1, and capacitors C1 and C2, the components of a switching converter in accordance with the present invention—including charge pump 34, series switch 30, and switch control circuit 36—may be integrated on a common substrate. However, high voltage diodes (e.g., D2, D3) and large capacitor values (e.g., C1, C2) may be difficult and/or costly to include in the integrated circuit. FIG. 4a shows an alternate version of the charge pump circuit specially adapted for integration with the boost converter. In junction isolated integrated circuits, most junctions which might be used as diodes also share another junction which diverts current from one of the desired junction terminals to a third terminal. Transistors are often used in the "diode connection" to avoid this problem. However the resulting diode-like structure is limited by the base-emitter reverse breakdown voltage of the transistors. In FIG. 4a, D2 is replaced by Q1, a diode-connected NPN, and D3 is replaced by Q2, a diode-connected PNP. Resistor 44 and C4 of the previous figures are removed and their functions taken over by device properties and sizing. A resistor 50 is added in series with C3 to limit peak current in charge pump 34, a feature that can be added to the other versions shown but is more important in a fully integrated version. All the components of this circuit except for L1, C1, C2, D1 and presumably the load can readily be integrated on several types of IC processes, and included as part of a boost converter IC.

Because of their direct connections to Z1, the base-emitter voltage to which Q1 and Q2 can be driven is controlled by Z1, which is selected to have a breakdown voltage (less a forward diode drop) lower than that of Q1 or Q2. Resistor 50 limits the peak currents to which these components can be driven, permitting them to be of minimum size.

When MN1 is on, C3 is charged with respect to $V_{out}$ through Q1. When MN1 goes off and switching node 10 is driven positive by L1, the charge on C3 is transferred to the gate circuit of MN2 by Q2. If C3 is sufficiently large, the charge will raise the voltage of MN2's gate by an amount sufficient to turn MN2 on with the first pulse.

However, in order to be a low resistance switch, MN2 will be a relatively large device having a large gate capacitance. If C3 is small compared to this capacitance, the entire charge on C3 will make only a small change in the gate voltage of MN2. After a number of cycles this will be sufficient to raise MN2's gate voltage beyond the threshold and MN2 will start to turn on and raise $V_{out}$ toward the C1 voltage. As it does so, the drain-gate capacitance of MN2 will tend to reduce the gate-source voltage of MN2, and this charge must be replaced by C3. In effect, the voltage boosting action of the charge pump with large capacitors can be replaced by a drive current limited by the MN1 switching voltage, the switching frequency, and C3. This current drives the gate of MN2 until the rate of rise of its source results in an equal current out of the drain-gate capacitance. At this point, the rate of rise of $V_{out}$ will be limited by the current-limited charge pump. So, by choosing C3 to have a value significantly less than the gate capacitance of MN2, the rate of rise of voltage $V_{out}$ can be controlled, and thereby the surge of current to charge the load and its capacitor can be easily limited. In effect, the gate capacitance of MN2 replaces or eliminates the need for C4 of the previous figures.

Once MN2's gate-source voltage reaches the breakdown voltage of Z1, MN2 will clamp $V_{out}$ to C1, and continued charge pulses from C3 will be diverted to Z1.

This circuit can automatically turn on $V_{out}$ when the boost converter starts. If MN3 is turned on when $V_{in}$ is first applied, for example by a power-on reset function, the gate of MN2 will be driven to zero, and $V_{out}$ will be off even though C1 may be charged to near $V_{in}$. Once the voltages equilibrate and MN3 is released, MN2 will remain off until the boost switching is initiated. Then, as MN1 switches to boost the C1 voltage, MN2 will come on slowly connecting $V_{out}$ to C1.

C3 need have only enough capacitance to overcome the parasitic capacitance of Q1, Q2, and connecting wiring, while it swings their junctions to greater than the Z1 voltage when driven by MN1. For a faster rise of $V_{out}$, C3 can be made proportionately larger, but most values will be very small (sub pF) and eminently integrable.

Q1 and Q2 could both be NPNs or PNPs, made from whichever transistor type is most compact in the IC process selected. However, by using two different transistor types (as shown), the above-mentioned parasitic device capacitance is limited to base-emitter capacitance, which will in general be the minimum attainable.

Figure 4B:
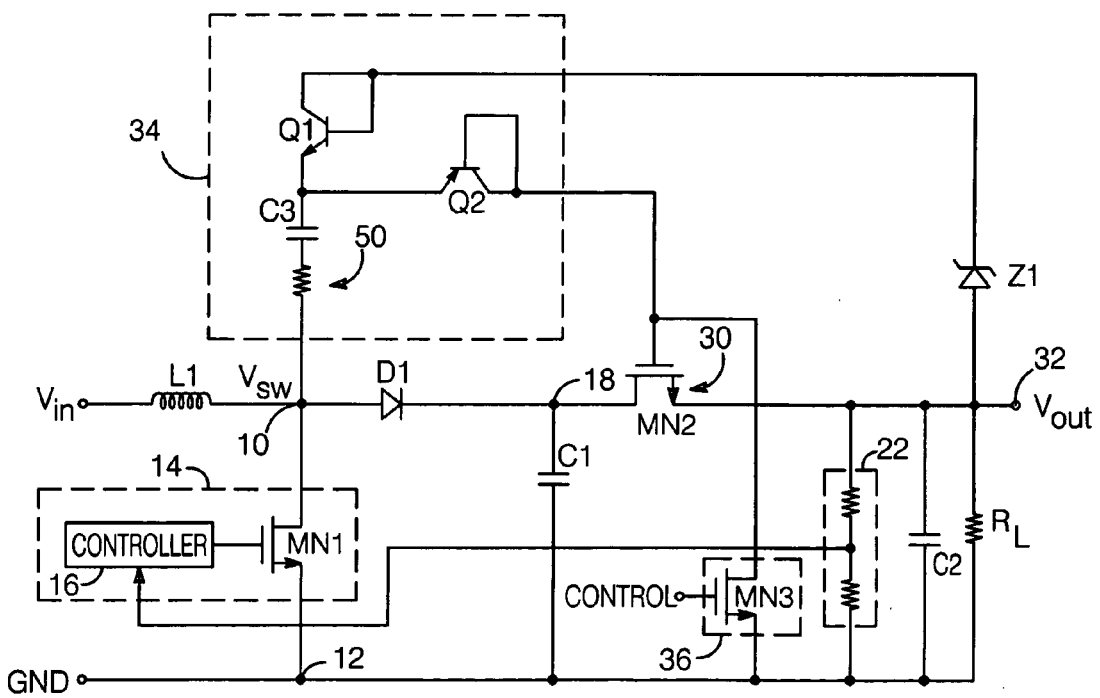
FIG. 4b is a schematic diagram of another possible implementation of a boost converter with series switch per the present invention.

If the capacitance of C3 will be selected to be much larger than the parasitic limit, a further simplification is possible; this is shown in FIG. 4b. Here, Z1 is made to be part of charge pump 34, as well as MN2's gate voltage limiter. When C3 drives negative, Z1 is forward biased and takes the place of Q1 to charge C3. As C3 is driven positive, Q2 becomes forward-biased, driving the MN2 gate positive until it reaches the voltage limit set by Z1. It will often be the case that the parasitic capacitance of Z1 to substrate or other nodes will be much larger than that of Q1, and the inclusion of Q1 as in FIG. 4a allows this capacitance to be part of the large capacitance at the gate of MN2. But if this is not an issue, the simpler circuit of FIG. 4b can be used.

While particular embodiments of the invention have been shown and described, numerous variations and alternate embodiments will occur to those skilled in the art. Accordingly, it is intended that the invention be limited only in terms of the appended claims.

We claim:

1. A switching voltage converter, comprising:
   an input node for receiving an input voltage $V_{in}$;

an output node at which said converter provides an output voltage $V_{out}$;

a switching circuit which comprises:
an inductor coupled between $V_{in}$ and a switching node,
a switch connected to control the voltage applied across said switching inductor, said switching circuit arranged to cycle said switch and thereby produce a switching voltage $V_{sw}$ at said switching node, and
a diode connected between said switching node and an intermediate node;

an n-type transistor having its current circuit connected in series between said intermediate node and said output node such that said transistor conducts current from said intermediate node to said output node when on;

a charge pump driven by said switching voltage $V_{sw}$ to provide a voltage $V_{on}$ at said n-type transistor's control input sufficient to turn said transistor on; and a series switch controller arranged to, in response to a control signal, hold said n-type transistor off such that output voltage $V_{out}$ is approximately zero regardless of the status of input voltage $V_{in}$, or allow said n-type transistor to be turned on by $V_{on}$.

2. The converter of claim 1, wherein said converter is a boost converter and said switch is connected between said switching node and a circuit common point.

3. The converter of claim 1, wherein said n-type transistor is an NMOS FET having its drain coupled to said intermediate node, its source coupled to said output node, and its gate coupled to said voltage $V_{on}$.

4. The converter of claim 1, wherein said n-type transistor is an NPN bipolar transistor having its collector coupled to said intermediate node, its emitter coupled to said output node, and its base coupled to said voltage $V_{on}$.

5. The converter of claim 1, wherein said switch, said charge pump, said n-type transistor, and said series switch controller are integrated on a common substrate.

6. The converter of claim 1, wherein said diode has its anode connected to said switching node and its cathode connected to said intermediate node, further comprising a load capacitor connected between said intermediate node and a circuit common point.

7. The converter of claim 6, further comprising a second load capacitor connected between said output node and said circuit common point.

8. The converter of claim 6, further comprising a feedback means arranged to provide a signal which varies with the voltage across said load capacitor to said switching circuit, said switching circuit arranged to receive said signal and to cycle said switch to achieve a desired output voltage $V_{out}$.

9. The converter of claim 8, wherein said feedback means comprises a voltage divider connected between said intermediate node and said circuit common point.

10. The converter of claim 6, further comprising a feedback means arranged to provide a signal which varies with the voltage at said output node to said switching circuit, said switching circuit arranged to receive said signal and to cycle said switch to achieve a desired output voltage $V_{out}$.

11. The converter of claim 10, wherein said feedback means comprises a voltage divider connected between said output node and said circuit common point.

12. The converter of claim 1, wherein said series switch controller is a second transistor having its current circuit connected between the control input of said n-type transistor and a circuit common point and its control input connected to said control signal.

13. The converter of claim 1, wherein said charge pump comprises:
a first capacitor connected between said switching node and a second node;
a first diode having its anode connected to said second node and its cathode connected to a third node;
a second capacitor connected between said third node and said output node; and
a second diode having its anode connected to said output node and its cathode connected to said second node, said third node coupled to the control input of said n-type transistor.

14. The converter of claim 13, further comprising a resistor connected in series between said third node and the control input of said n-type transistor.

15. The converter of claim 1, wherein said charge pump comprises:
a first capacitor connected between said switching node and a second node;
a second diode having its anode connected to said second node and its cathode connected to a third node;
a second capacitor connected between said third node and said output node; and
a third diode having its anode connected to said intermediate node and its cathode connected to said second node, said third node coupled to the control input of said n-type transistor.

16. The converter of claim 1, further comprising a voltage limiting circuit connected to limit the voltage ($V_{on}$-$V_{out}$) applied across said n-type transistor.

17. The converter of claim 16, wherein said voltage limiting circuit comprises a zener diode.

18. The converter of claim 1, wherein said charge pump comprises:
a first capacitor connected between said switching node and a second node;
a first diode-connected bipolar transistor having its emitter connected to said second node and its base and collector coupled to the control input of said n-type transistor; and
a second diode-connected bipolar transistor having its emitter connected to said second node and its base and collector connected to said output node.

19. The converter of claim 18, further comprising a resistor connected in series between said switching node and said first capacitor to limit the peak current in said charge pump.

20. The converter of claim 18, further comprising a zener diode connected to limit the voltage ($V_{on}$-$V_{out}$) across said n-type transistor and the base-emitter voltages of said first and second diode-connected bipolar transistors.

21. The converter of claim 1, wherein said charge pump comprises:
a first capacitor connected between said switching node and a second node;
a diode-connected bipolar transistor having its emitter connected to said second node and its base and collector coupled to the control input of said n-type transistor; and
a zener diode having its anode connected to said second node and its cathode connected to said output node.

22. The converter of claim 21, further comprising a resistor connected in series between said switching node and said first capacitor to limit the peak current in said charge pump.

23. A boost converter, comprising:
an input node for receiving an input voltage $V_{in}$;

an output node at which said converter provides an output voltage $V_{out}$;

a switching circuit which comprises:
   an inductor coupled between $V_{in}$ and a switching node, and
   a switch connected between said switching node and a circuit common point which controls the voltage applied across said inductor;

a diode having its anode connected to said switching node and its cathode connected to an intermediate node;

an n-type transistor having its current circuit connected in series between said intermediate node and said output node such that said transistor conducts current from said intermediate node to said output node when on;

a load capacitor connected between said intermediate node and said circuit common point;

a feedback means arranged to provide a signal which varies with the voltage across said load capacitor to said switching circuit, said switching circuit arranged to receive said signal and to cycle said switch to achieve a desired output voltage $V_{out}$, said cycling producing a switching voltage $V_{sw}$ at said switching node;

a charge pump driven by said switching voltage $V_{sw}$ to provide a voltage $V_{on}$ at said n-type transistor's control input sufficient to turn said transistor on; and a series switch controller arranged to, in response to a control signal, hold said n-type transistor off such that output voltage $V_{out}$ is approximately zero regardless of the status of input voltage $V_{in}$, or allow said n-type transistor to be turned on by $V_{on}$.

24. The converter of claim 23, wherein said n-type transistor is an NMOS FET having its drain connected to said intermediate node, its source connected to said output node, and its gate coupled to said voltage $V_{on}$.

25. The converter of claim 23, wherein said switch, said charge pump, said n-type transistor, and said series switch controller are integrated on a common substrate.

* * * * *